United States Patent
Davis et al.

(10) Patent No.: US 9,519,890 B2
(45) Date of Patent: Dec. 13, 2016

(54) DISPLAY OF INVITEE-POSTED UPDATE INFORMATION REGARDING MEETING WITHIN CALENDARING-ORIENTED COMPUTER PROGRAM

(71) Applicant: INTERNATIONAL BUSINESS MACHINES CORPORATION, Armonk, NY (US)

(72) Inventors: Michelle Davis, Raleigh, NC (US); Darryl M. Adderly, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 13/751,113

(22) Filed: Jan. 27, 2013

(65) Prior Publication Data
US 2014/0215355 A1 Jul. 31, 2014

(51) Int. Cl.
*G06Q 10/10* (2012.01)

(52) U.S. Cl.
CPC .................. *G06Q 10/109* (2013.01)

(58) Field of Classification Search
CPC ... G06F 15/0266; G06Q 10/06; G06Q 10/109; G06Q 10/10; G06Q 10/107
See application file for complete search history.

(56) References Cited

U.S. PATENT DOCUMENTS

| | | | | |
|---|---|---|---|---|
| 6,480,830 B1 * | 11/2002 | Ford et al. | | 705/7.19 |
| 2004/0215499 A1 * | 10/2004 | Leist | | 705/8 |
| 2007/0143412 A1 * | 6/2007 | Qi | | 709/206 |
| 2008/0114636 A1 * | 5/2008 | Nellutla | | 705/9 |
| 2009/0018887 A1 * | 1/2009 | Bank et al. | | 705/8 |
| 2012/0110085 A1 * | 5/2012 | Malik | | G06Q 10/00 709/205 |
| 2014/0164525 A1 * | 6/2014 | Malik et al. | | 709/206 |

OTHER PUBLICATIONS

International Business Machines Corporation, "Method and Process for supporting Asynchronous Pre-Meeting Opinion exchanges between Invitees", IP.com, IPCOM000160912D, Dec. 3, 2007.

* cited by examiner

*Primary Examiner* — Jeffrey A Gaffin
*Assistant Examiner* — Mandrita Brahmachari
(74) *Attorney, Agent, or Firm* — Damion Josephs

(57) ABSTRACT

A calendaring-oriented computer program displays a meeting to which a user of the program has been invited to participate. The program visually indicates that a first other user who has also been invited to participate in the meeting has posted first update information relevant to the meeting and that the user is permitted to view. The program permits the user to post second update information relevant to the meeting and to specify a second other user who has also been invited to participate in the meeting as being permitted to view the second update information. The program permits the user to schedule a time at which the second update information is to be posted. The program permits the user to view the first update information and to post the second update information regardless of whether the user accepts, delegates, or declines, or has accepted, delegated, or declined, the meeting.

16 Claims, 5 Drawing Sheets

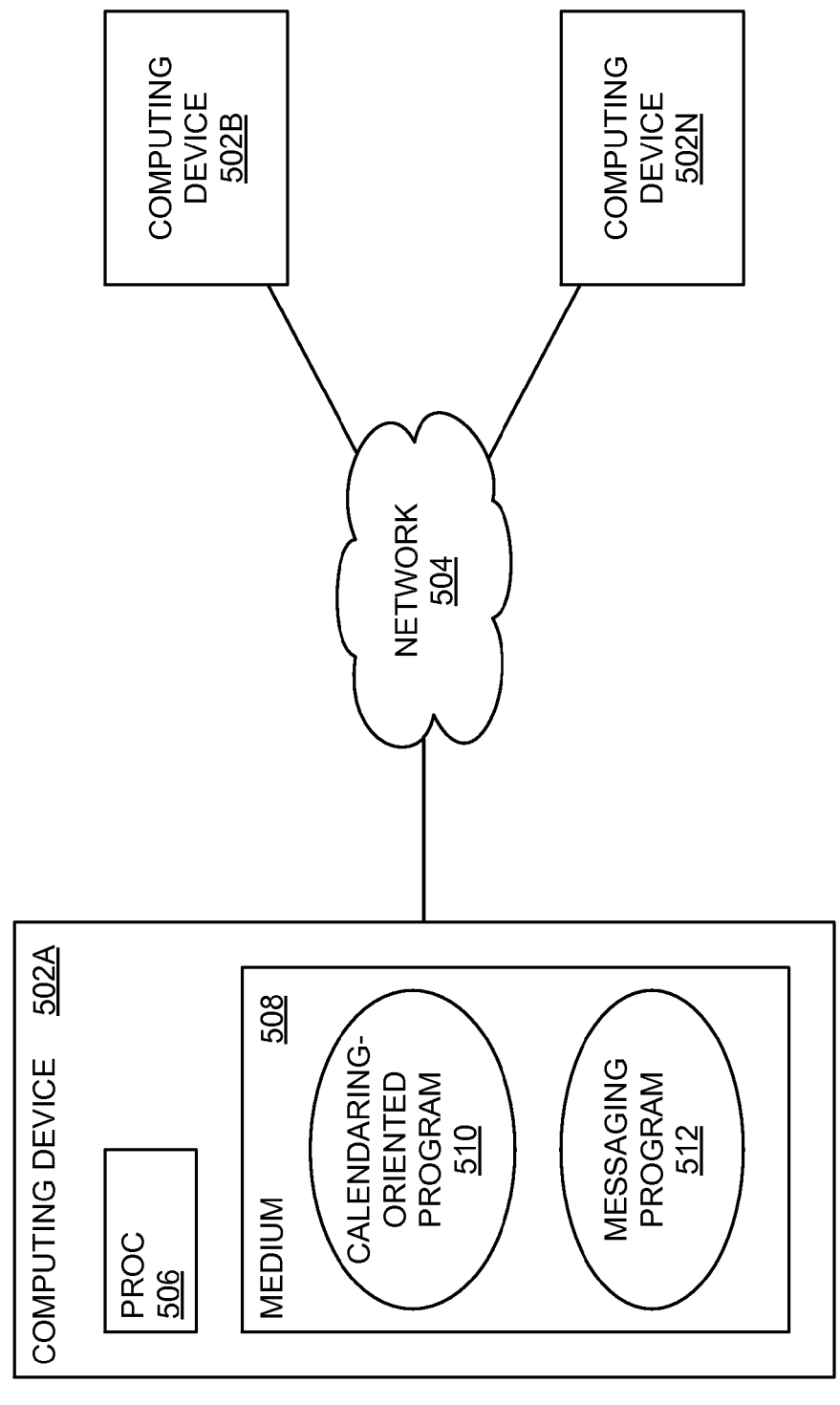

DISPLAY OF INVITEE-POSTED UPDATE INFORMATION REGARDING MEETING WITHIN CALENDARING-ORIENTED COMPUTER PROGRAM

BACKGROUND

Calendaring-oriented computer programs permit users to keep track of their personal and professional schedules, so that they do not miss appointments and other events. A calendaring-oriented computer program can also be referred to as a calendaring program or a scheduling program. Besides being able to manage a user's own appointments and events, a user can within many calendaring-oriented computer programs schedule meetings—both in-person and virtual—with other users. For example, a user may be a moderator or organizer of a meeting who can invite other users to attend the meeting. When an invitee accepts an invitation, the meeting is scheduled on and viewable within the invitee's own calendaring-oriented computer program.

SUMMARY

An example method of the disclosure includes, upon a user causing a computing device to open a calendaring-oriented computer program, displaying, by the calendaring-oriented computer program running on the computing device, a meeting to which the user has been invited to participate. The method includes visually indicating within the calendaring-oriented computer program, by the calendaring-oriented computer program running on the computing device, that a different user who also has been invited to participate in the meeting has posted update information relevant to the meeting and that the different user has permitted the user to view.

Another example method of the disclosure includes, upon a user causing a computing device to open a calendaring-oriented computer program, displaying, by the calendaring-oriented computer program running on the computing device, a meeting to which the user has been invited to participate. The method includes permitting, by the calendaring-oriented computer program running on the computing device, the user to post update information relevant to the meeting and to specify a different user who also has been invited to participate in the meeting as being permitted to view the update information within another calendaring-oriented computer program running on another computing device. The method includes receiving, by the calendaring-oriented computer program running on the computing device, input from the user corresponding to the update information relevant to the meeting and specifying the different user. The method includes posting, by the calendaring-oriented computer program running on the computing device, the update information to which the input received from the user corresponds.

An example computer program product of the disclosure includes a computer-readable storage medium having computer-readable code embodied therein. The computer-readable code is for a calendaring-oriented computer program and is executable by a processor of a computing device. The computer-readable code includes first computer-readable code to display a meeting to which a user of the calendaring-oriented computer program has been invited to participate. The computer-readable code includes second computer-readable code to visually indicate within the calendaring-oriented computer program that a first other user who has also been invited to participate in the meeting has posted first update information relevant to the meeting and that the first other user has permitted the user to view. The computer-readable code includes third computer-readable code to permit the user to post second update information relevant to the meeting and to specify a second other user who has also been invited to participate in the meeting as being permitted to view the second update information within another calendaring-oriented computer program running on another computing device.

BRIEF DESCRIPTION OF THE SEVERAL VIEWS OF THE DRAWINGS

The drawings referenced herein form a part of the specification. Features shown in the drawing illustrate only some embodiments of the disclosure, and not all embodiments of the disclosure, unless the detailed description explicitly indicates otherwise, and readers of the specification should not make implications to the contrary.

FIG. 5 is a diagram of an example system.

DETAILED DESCRIPTION

Figure 1:
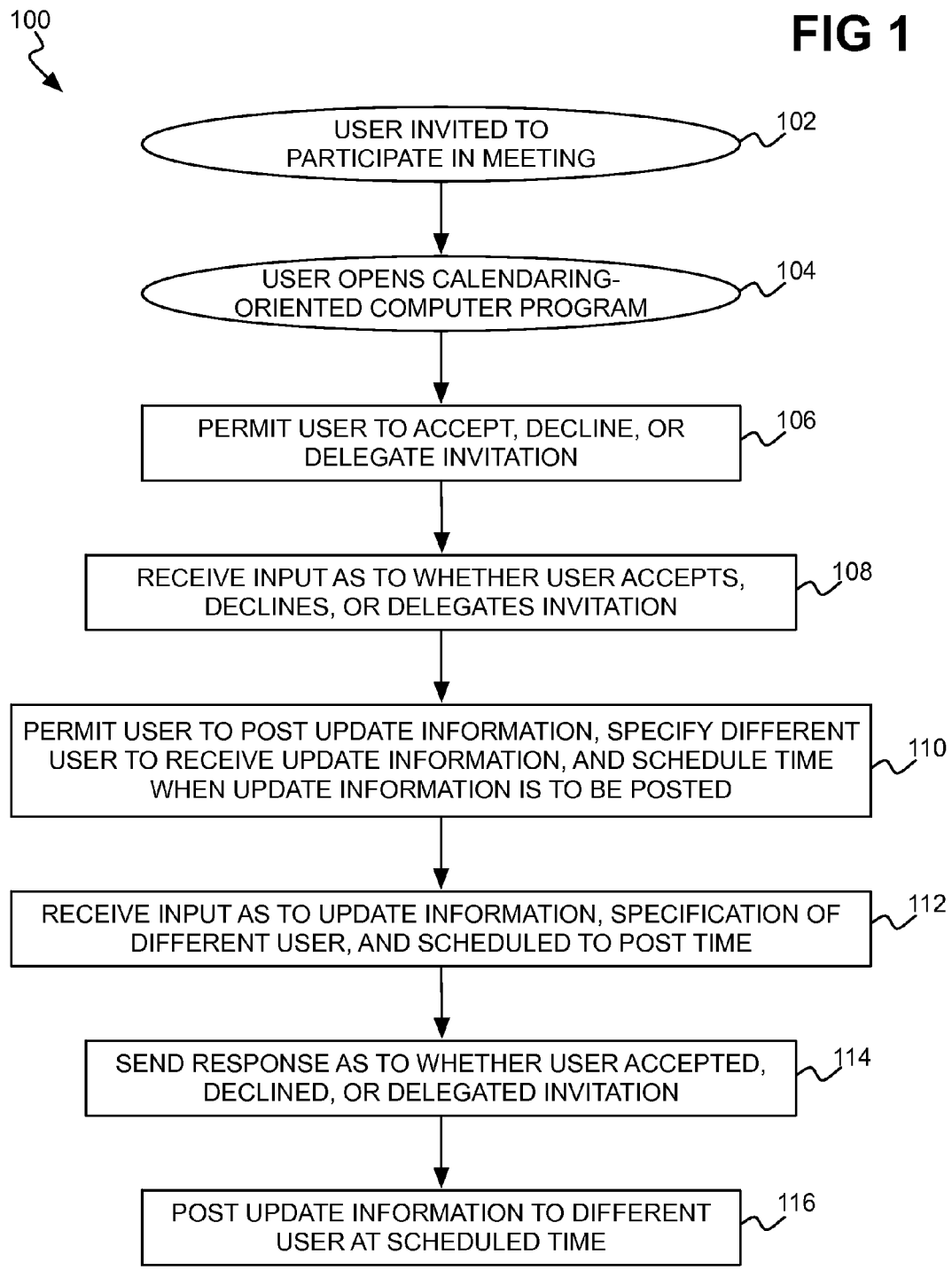
FIG. 1 is a flowchart of an example method performed from the perspective of a user who has received an invitation to attend a meeting and wishes to send update information relevant to the meeting for viewing by a different user who also has been invited to the meeting.

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

As noted in the background section, calendaring-oriented computer programs permit meetings to be scheduled among multiple users. A user who has been invited to attend a meeting can accept or decline the meeting, and the other users, or at least the meeting moderator or organizer, receives feedback to this effect. Existing calendaring-oriented computer programs suffer from at least two drawbacks in their meeting-scheduling capabilities.

First, users, including invitees, may want to send update information regarding the meeting. For example, a user may want to suggest additional topics for discussion during the meeting, or attach documents that should be reviewed prior to or during the meeting. Such update information is currently sent outside the scope of calendaring-oriented computer programs, such as within messaging-oriented computer programs like email programs and text-messaging programs. It can therefore be difficult for users—particularly invitees to meetings as opposed to moderators or organizers of the meetings—to effectively manage and organize this update information and correlate the information with the meeting itself, particularly because conventional approaches do not permit invitees specifically to send such update information.

Second, users, including invitees, may want to schedule the transmission of update information at a future time or date. For example, a user may want to provide information regarding a meeting's topics fairly close to the actual time at which the meeting is to be held. Currently, the user has to wait until the desired time in question to send this update information, which is then immediately sent. However, the user may be planning to be away from his or her computing device at that time, which means that it can be difficult for users to effectively manage when they post update information regarding meetings.

Disclosed herein are techniques that alleviate these shortcomings to existing calendaring-oriented computer programs. A calendaring-oriented computer program for a user who has been invited to attend a meeting visually indicates within the program itself that another user who has also been invited to attend the meeting has posted update information relevant to the meeting and that the user is permitted to view. The user can view this information within the calendaring-oriented computer program, and can receive a message, such as an email or a text message, indicating that this update information has been posted. The calendaring-oriented computer program likewise permits the user to post update information relevant to a meeting to which the user has been invited to attend, and to specify who of the other users that have also been invited to attend are permitted to view the information. The user can schedule when this update information will be posted and thus viewable by the other users.

FIG. 1 shows an example method 100 performed from the perspective of a user who has received an invitation to attend (i.e., participate in) a meeting and wishes to send update information relevant to the meeting for viewing by a different user who also has been invited to the meeting. A meeting organizer or moderator—i.e., another user—invites the user to attend the meeting (102). That is, the organizer or moderator creates a new event or other type of meeting using his or her calendaring-oriented computer program, proposing a time and day, entering information regarding the meeting, and inviting one or more invitees including the user to the meeting. The information that is entered can include whether the meeting is in-person or virtual, the topics to be discussed during the meeting, and so on. The calendaring-oriented computer program of the organizer or moderator sends meeting invitations to the user and any other invitee, such as through a messaging computer program like an email-oriented computer program.

The user receives the invitation, and thus opens his or her calendaring-oriented computer program on a computing device (104), such as a desktop or a laptop computer, a smartphone, a tablet computing device, and so on. The calendaring-oriented computer program may be a stand-alone computer program that runs directly on the computing device. The calendaring-oriented computer program may be part of a computer program that provides other functionality as well, such as messaging functionality. The calendaring-oriented computer program may be a web app or a web site that the user accesses through a web-browsing computer program running on the computing device in question.

Opening the calendaring-oriented computer program can include, where the computer program is not yet running on the computing device, selecting the computer program to cause the program to run. Opening the calendaring-oriented computer program can include switching focus of the user interface of the computing device from a different program to the calendaring-oriented computer program, where the calendaring-oriented computer program is already running on the computing device. For instance, the user may select a link within an email or other message corresponding to the meeting invitation. Opening the calendaring-oriented computer program can include browsing to a web app or web site on a web-browsing computer program.

The calendaring-oriented computer program permits the user to accept, decline, or delegate the invitation (106). Accepting the invitation means that the user at least tentatively has confirmed that he or she will be attending the meeting. Declining the invitation means that the user at least tentatively has indicated that he or she will not be attending the meeting, and can include the user proposing an alternative date and/or time for the meeting. Delegating the meeting invitation means that the user will not attend the meeting but will authorize another person to attend the meeting in his or her place. The calendaring-oriented computer program thus receives input from the user as to whether he or she accepts, declines, or delegates the invitation (108).

The calendaring-oriented computer program permits the user to post update information relevant to the meeting, specify a different user to receive the update information, and schedule a time when the update information is to be posted to the different user (110). The user is permitted to post update information relevant to the meeting regardless of whether the user has accepted or declined the invitation to attend the meeting. The update information can include text entered by the user, for instance, as well as one or more attached files.

The user specifies a different user who has also been invited to attend the meeting to receive the update information insofar as one or more different users other than the user him or herself can be specified. The different user may include, but does not necessarily have to include, the moderator or organizer of the meeting. The user does not have to specify all of the invitees to a meeting. For example, a meeting organizer may be trying to organize a meeting with four participants: the organizer him or herself, the user in relation to whom the method 100 is performed, and two other users. The user can thus specify one or more of the organizer and the two other users in this example.

The user can schedule a time when the update information is to be posted to the specified different user, such that the different user does not receive and/or cannot view the update information until the scheduled time. The scheduled time may be immediately, one or more of a desired date and a desired time in the future (such as prior to when the meeting is to occur), or a desired length of time before the meeting is scheduled to occur, such as one hour, one day, and so on, before the meeting. If no time is scheduled, it is presumed that the user wishes for the update information to be posted immediately or a time that the user has profiled as the default, such as, for example, one hour before the meeting time. The calendaring-oriented computer program thus receives input from the user as to the update information, the different user specification, and the scheduled posting time (112).

The calendaring-oriented computer program sends a response as to whether the user has accepted, declined, or delegated the invitation (114). The response can be sent as an email or other type of message via a messaging computer program, like an email-oriented computer program, at the behest of the calendaring-oriented computer program. At the scheduled time, the update information is posted to the specified different user (116), in the same or different manner. If the update information is to be posted immediately, then the response regarding invitation acceptance or declination may include the update information; otherwise, the update information is sent later, at the scheduled time in question.

Figure 2:
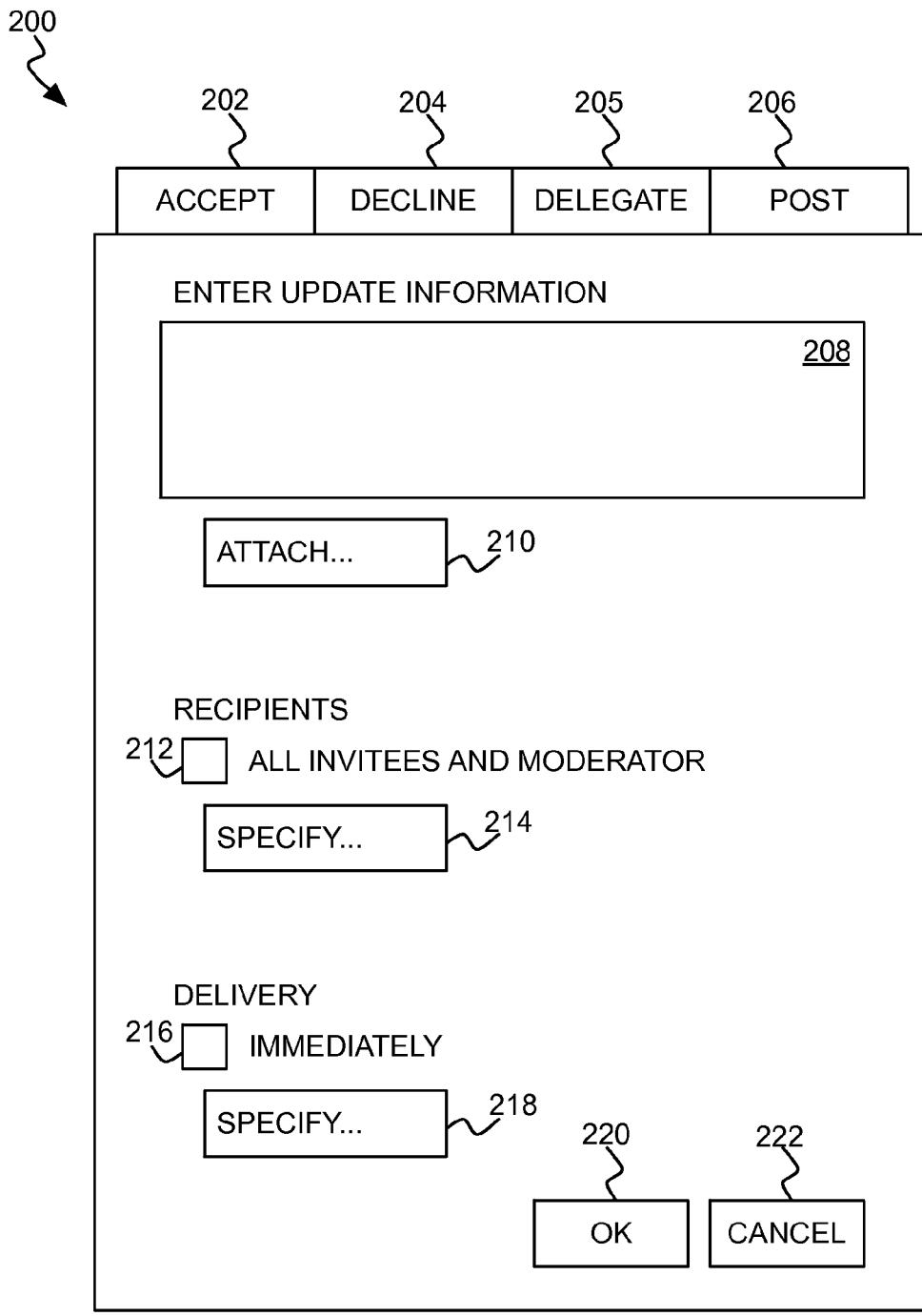
FIG. 2 is a diagram of an example graphical user interface (GUI) of a calendaring-oriented computer program by which a user can enter update information, specify users to receive the update information, and schedule a time to post the update information.

FIG. 2 shows an example graphical user interface (GUI) 200 of a calendaring-oriented computer program, by which the user in relation to which the method 100 is performed can provide the update information to specified users at a scheduled time. The GUI 200 includes buttons, or tabs, 202, 204, 205, and 206. The user can select the button 202 to accept a meeting invitation, the button 204 to decline the invitation to attend the meeting, or the button 205 to delegate the meeting.

The user can select the button 206 to post update information relevant to the meeting, to specify the different user that can view this information, and to schedule a time when the update information is to be posted. The user enters desired update information within a text box 208, and can also attach one or more files that are part of this update information by selecting a button 210. Selecting the button 210 can cause a file dialog box to be displayed via which the user can select the desired file.

The user can select a checkbox 212 to specify that all the other invitees to the meeting, as well as the moderator or organizer of the meeting, can view the update information. The user can instead select a button 214 to specify which other users that have been invited to the meeting (including the moderator) can view the update information, such that not all the other invitees and/or the moderator can view the update information. Selecting the button 214 can cause a list box to be displayed via which the user can individually select and deselect the other invitees and the moderator or organizer in this respect.

The user can select a checkbox 216 to specify that the update information is to be posted to the specified users immediately. The user can instead select a button 218 to specify when the update information is to be posted to the specified users. Selecting the button 218 can cause a calendar to be displayed via which the user can select the desired date and/or time in this respect. Once the user is satisfied with the update information, the specified users, and the scheduled time, he or she can select a button 220. If the user decides instead not to enter any update information, he or she can select a button 222.

Figure 3:
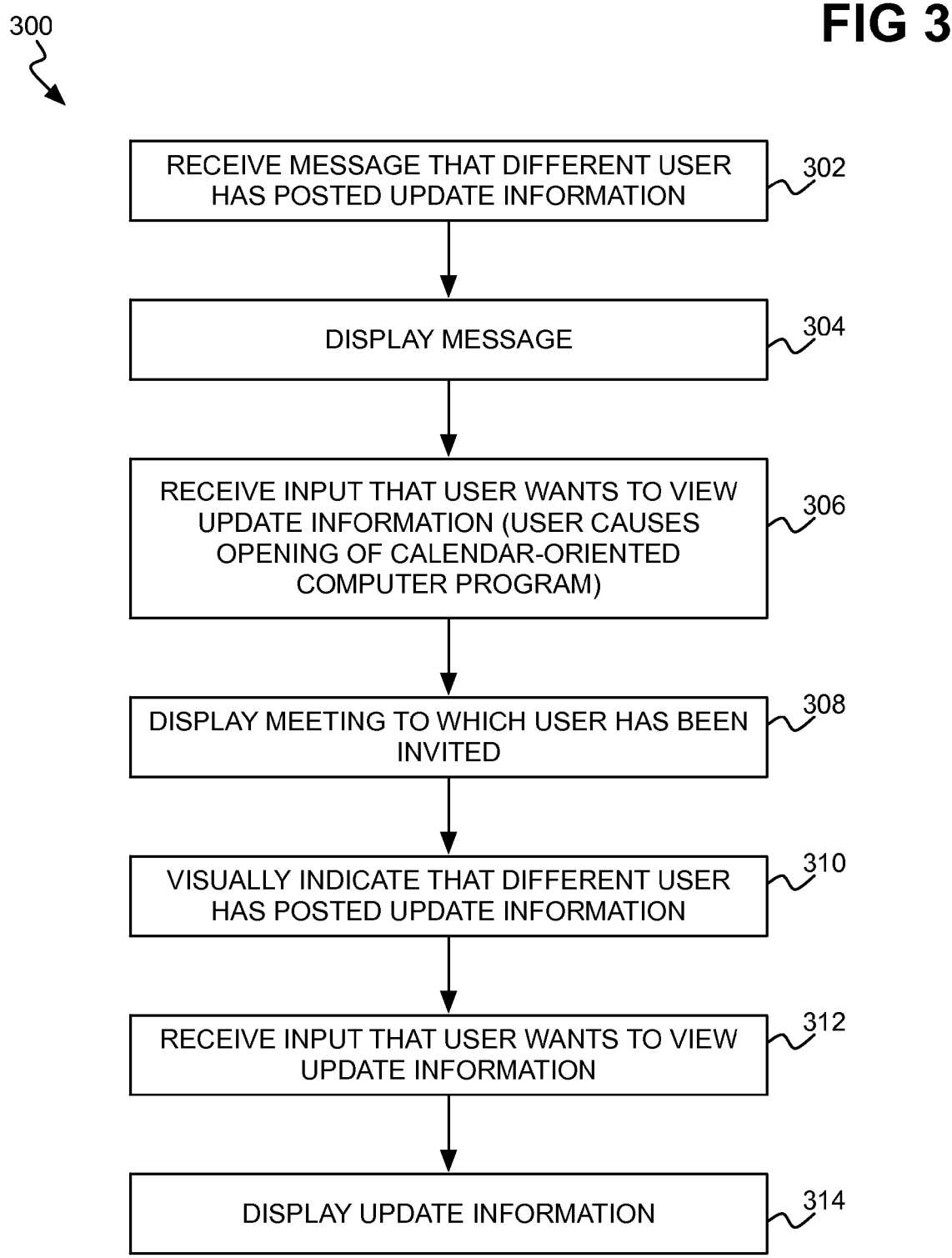
FIG. 3 is a flowchart of example method performed from the perspective of a user who has received an invitation to attend a meeting for which a different user has posted update information relevant to the meeting.

FIG. 3 shows an example method 300 performed from the perspective of a user who has received an invitation to attend (i.e., participate in) a meeting for which a different user has posted update information relevant to the meeting. The user in question may have already accepted, declined, or delegated the invitation, or may do so as part of the method 300. That is, parts 106, 108, and 114 of the method 100 may also be part of the method 300.

A computer program, like a messaging computer program such as an email program, receives a message that the different user has posted update information (302). The message may thus be received in the form of an email, but may also be received as a different type of message, such as a text message received within a messaging program on a smartphone, which is another type of messaging computer program. The update information is relevant to the meeting to which the user has been invited, and the different user has specified the user as being able to view the update information. The message is not received until after the scheduled time that the different user may have specified regarding when the update information is to be posted. The messaging program displays the message to the user (304).

The messaging program receives input that the user wants to view the update information (306). For instance, the user may select a link to the update information contained within the message. This effectively means that the user causes his or her calendaring-oriented computer program to be opened on a computing device, such as a desktop or a laptop computer, a smartphone, a tablet computing device, and so on. The user may also cause the calendaring-oriented computer program to be opened to view the update information apart from sending such input to the messaging program, which can be running on the same or a different computing device as that on which the calendaring-oriented computer program is running.

The calendaring-oriented computer program displays the meeting to which the user has been invited (308). As noted above, the user may have already accepted, declined, or delegated the invitation to attend the meeting, or can do so after he or she has viewed the update information. The user thus is able to view the update information relevant to the meeting that the different user has posted irrespective of whether the user has declined, delegated, or accepted the invitation, and irrespective of whether the user has not yet declined, delegated, or accepted the invitation.

The calendaring-oriented computer program visually indicates within the program itself that the different user, who also has been invited to attend the meeting, has posted the update information relevant to the meeting and that the different user has permitted the user to view (310). For example, a GUI element identifying the different user may be displayed as part of the meeting within the calendaring-oriented computer program. The calendaring-oriented computer program receives input that the user wants to view the update information (312). For example, the user may select the GUI element identifying the different user.

As such, the calendaring-oriented computer program displays within the program itself the update information that the different user has posted (314). It is noted that the display of the update information may be automatically performed as part of visual indication that the different user has posted this update information in part 310 in one implementation. The user is also permitted to add his or her own update information, such that parts 110, 112, 114, and 116 of the method 100 can be part of the method 300. In such instance, if the user is replying to the different user's update information, the back-and-forth messaging may be displayed in a threaded message manner within the calendaring-oriented computer program.

Figure 4:
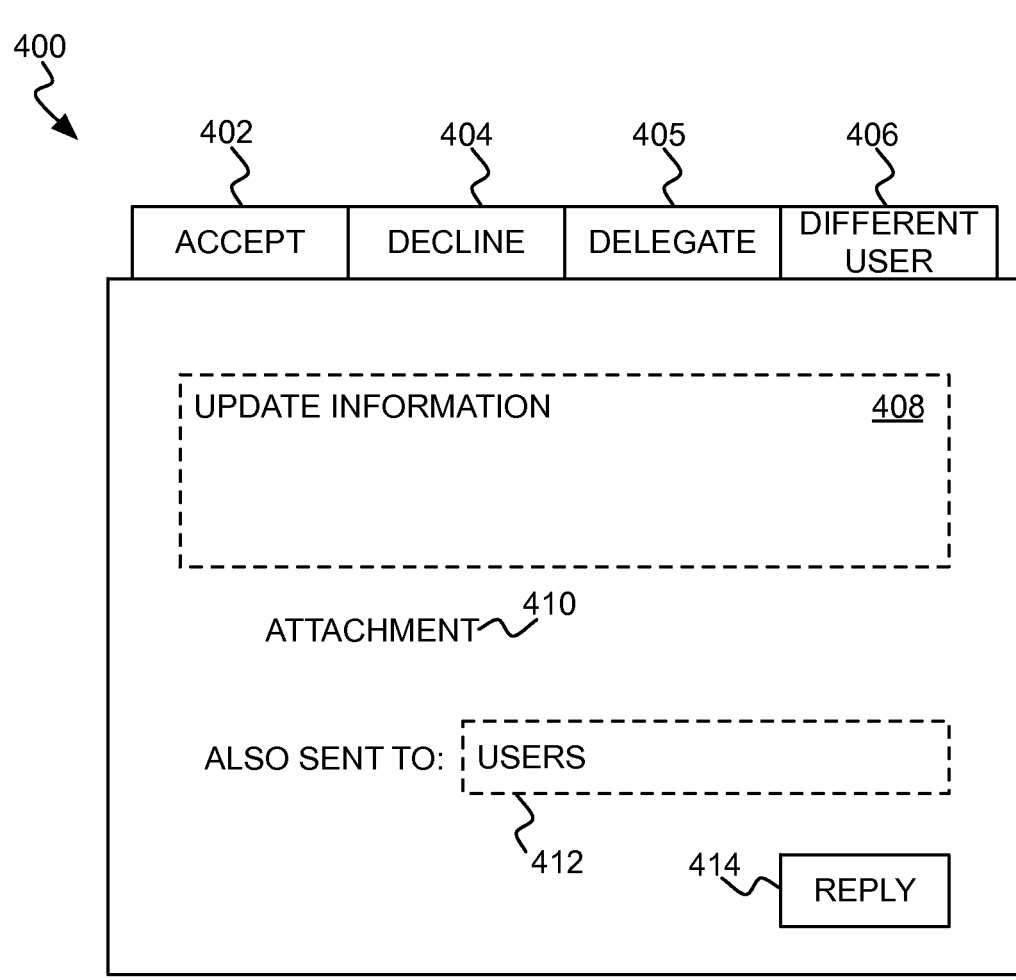
FIG. 4 is a diagram of an example GUI of a calendaring-oriented computer program by which a user can view update information entered by a different user after the scheduled time the different user has specified the information to post, and whom the different user has specified as having permission to view the information.

FIG. 4 shows an example GUI 400 of a calendaring-oriented computer program, by which the user in relation to which the method 300 is performed can view update information posted by a different user after a scheduled time that the different user specified for this information to post, where the different user identified the user as being permitted to view the information. The GUI 400 includes buttons, or tabs, 402, 404, 405, and 406. The user can select the button 402 to accept the meeting information to which the update information is relevant, the button 404 to decline the invitation, or the button 405 to delegate the meeting invitation.

The button 406 visually identifies the identity of the different user that posted the update information. The user can select the button 406 to cause this update information to be displayed within the calendaring-oriented computer program for the user to view. An update information area 408 displays the update information entered by the different user. If the different user attached a file, the user can open the file. For example, the user can select an attachment 410 to cause the attachment 410 to be opened within a computer program that is designed for viewing such an attachment.

A users area 412 can be included that displays the users specified by the different user as being permitted to view the update information. The users area 412 may also indicate whether each such user has viewed the update information yet or not. The user can select a reply button 414 to add his or her update information in response to the update information that the different user has posted. Selecting the reply button 414 can cause a new window to be opened, similar to the GUI 200, by which the user can enter this information, or the GUI 400 itself may expand to include GUI elements such as those depicted in the GUI 200. When the user selects the reply button 414 to add update information in response to the update information that the different user has posted, the added update information may be displayed in a threaded manner in conjunction with the original update information that the different user posted.

The GUI 400 can be integrated with the GUI 200. For example, the GUI 400 may also include a post button 206 like the GUI 200 does. The difference between the user selecting the post button 206 to post update information and the user selecting the reply button 414 to post update information can be the manner by which this update information is displayed. In the former, the update information is displayed in its own tab identifying the user, as with the different user in relation to the button or tab 406. In the latter, the user's update information can be displayed in a threaded manner in conjunction with the update information posted by the different user, under the button or tab 406 itself.

FIG. 5 shows an example system 500 in relation to which the methods 100 and 300 and the GUIs 200 and 400 can be implemented. The system 500 includes computing devices 502A, 502B, . . . , 502N, which are collectively referred to as the computing devices 502. The computing devices 502 are communicatively interconnected to one another via a network 504. The computing devices 502 can each be a laptop computer, a desktop computer, a tablet computing device, a smartphone, or another type of computing device. The network 504 can be or include the Internet, an intranet, an extranet, a local-area network (LAN), a wide-area network (WAN), a telephony network, and so on, among other types of networks.

The computing device 502A is described representative of all the computing devices 502. The computing device 502 includes at least hardware such as a processor 506, and a computer-readable storage medium 508. The computer-readable storage medium 508 stores computer-executable code, which may be executed by the processor 506, for instance, to realize a calendaring-oriented computer program 510 and a messaging computer program 512. The calendaring-oriented computer program 510 and the messaging computer program 512 are implemented to perform the methods 100 and 300 as described above, and the calendaring-oriented computer program 510 can display the GUIs 200 and 400 that have been described above.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
upon a user causing a computing device to open a calendaring-oriented computer program,
displaying, by the calendaring-oriented computer program running on the computing device, a meeting to which the user has been invited to participate as received from a moderator that has previously caused the meeting to be created and sent;
permitting, by the calendaring-oriented computer program running on the computing device, the user to post update information relevant to the meeting and to specify:
a different user who also has been invited to participate in the meeting as being permitted to view the update information within another calendaring-oriented computer program running on another computing device; and
a scheduled time at which the update information is to be posted;
receiving, by the calendaring-oriented computer program running on the computing device, input from the user corresponding to the update information relevant to the meeting and specifying the different user and the scheduled time; and
posting, by the calendaring-oriented computer program running on the computing device, the update information to which the input received from the user corresponds, at the scheduled time to the different user, such that the update information is posted at the schedule time that is later than a time at which the moderator previously caused the meeting to be created and sent and that is later than a time at which the calendar-oriented computer program received the meeting,
wherein a computing device of the different user, a graphical user interface (GUI) is displayed, comprising:
a window;
a plurality of tabs on top of the window, including:
a first tab that is left-most on top of the window, the first tab selectable to accept the meeting by the different user;
a second tab immediately to the right of the first tab, the second tab selectable to decline the meeting by the different user;
a third tab immediately to the right of the second tab, the third tab selectable to delegate the meeting by the different user to another user;
a fourth tab identifying the user that posted the update information, the fourth tab selectable to display in the window:
a first area towards a top of the window in which the update information is displayed;
an identification of an attachment provided by the user with the update information, below the update information, the identification selectable by the different user to open the attachment;
identification of any other users to whom the update information was also sent, below the identification of the attachment; and
a reply button below the identification of the any other users, the reply button selectable by the different user to reply to add additional information to the update information.

2. The method of claim 1, wherein the scheduled time is specified as one of:
one or more of a desired date and a desired time;
a desired length of time before the meeting is scheduled to occur.

3. The method of claim 1, further comprising:
permitting, by the calendaring-oriented computer program running on the computing device, the user to accept, delegate, or decline the meeting; and
receiving, by the calendaring-oriented computer program running on the computing device, additional input from the user corresponding to whether the user is accepting, delegating, or declining the meeting,
wherein the user is permitted to post the update information relevant to the meeting and to specify a different user regardless of whether the user is accepting, delegating, or declining the meeting.

4. The method of claim 1, wherein the user specifies the different user as one or more but less than all users that have been invited to participate in the meeting.

5. The method of claim 1, further comprising displaying, by the calendaring-oriented computer program, a second GUI, comprising:
a second window;
a plurality of second tabs on top of the second window, including:
a first tab that is left-most on top of the window, the first tab selectable to accept the meeting by the user;
a second tab immediately to the right of the first tab, the second tab selectable to decline the meeting by the user;
a third tab immediately to the right of the second tab, the third tab selectable to delegate the meeting by the user to a second other user;
a fourth tab labeled "post" to the right of the third tab, the fourth tab selectable to display in the second window:
a first area towards a top of the second window in which the user is permitted to enter the update information;
an attach button below the first area that is selectable by the user to attach an attachment related to the update information;
a first checkbox below the attach button that is selectable by the user to indicate that a moderator of the meeting and all invitees of the meeting are to receive the update information;
a first specify button below the first checkbox that is selectable by the user to specify which of the moderator and the invitees of the meeting are to receive the update information;
a second checkbox below the first specify button that is selectable by the user to specify that the update information is to be sent immediately;
a second specify button below the second checkbox that is selectable by the user to specify a later date and time at which the update information is to be sent;
an OK button below the second specify button that is selectable by the user to send the update information;
a cancel button to the right of the OK button that is selectable by the user to not send the update information.

6. A computer program product comprising:
a non-transitory storage device storing computer-readable code for a calendaring-oriented computer program, executable by a processor of a computing device, and comprising:
first computer-readable code to display a meeting to which a user of the calendaring-oriented computer program has been invited to participate;
second computer-readable code to visually indicate within the calendaring-oriented computer program that a first other user who has also been invited to participate in the meeting has posted first update information relevant to the meeting and that the first other user has permitted the user to view; and
third computer-readable code to:
permit the user to post second update information relevant to the meeting;
specify:
a second other user who has also been invited to participate in the meeting as being permitted to view the second update information within another calendaring-oriented computer program running on another computing device; and
a scheduled time at which the update information is to be posted;
receive input from the user corresponding to the second update information relevant to the meeting and specify the second other user; and
post the second update information to which the input received from the user corresponds, at the scheduled time to the second other user, such that the update information is posted at the scheduled time that is later than a time at which a moderator previously caused the meeting to be created and sent and that is later than a time at which the calendaring-oriented computer program received the meeting,
wherein a computing device of the first other user, a graphical user interface (GUI) is displayed, comprising:
a window;
a plurality of tabs on top of the window, including:
a first tab that is left-most on top of the window, the first tab selectable to accept the meeting by the first other user;
a second tab immediately to the right of the first tab, the second tab selectable to decline the meeting by the first other user;
a third tab immediately to the right of the second tab, the third tab selectable to delegate the meeting by the first other user to another user;
a fourth tab identifying the user that posted the second update information, the fourth tab selectable to display in the window:
a first area towards a top of the window in which the second update information is displayed;
an identification of an attachment provided by the user with the second update information, below the second update information, the identification selectable by the first other user to open the attachment;
identification of any other users to whom the second update information was also sent, below the identification of the attachment; and
a reply button below the identification of the any other users, the reply button selectable by the first other user to reply to add additional information to the second update information.

7. The computer program product of claim 6, wherein the second-computer readable code is to visually indicate within the calendaring-oriented computer program that the first other user has posted the first update information relevant to the meeting by:
  displaying a graphical user interface (GUI) element identifying the first other user.

8. The computer program product of claim 6, wherein the second-computer readable code is to visually indicate within the calendaring-oriented computer program that the first other user has posted the first update information relevant to the meeting by:
  displaying the first update information relevant to the meeting posted by the first other user.

9. The computer program product of claim 6, wherein the second-computer readable code is further to:
  receive input from the user corresponding to the user wanting to view the first update information relevant to the meeting posted by the first other user; and
  display, in response to receiving the input, the first update information relevant to the meeting posted by the first other user.

10. The computer program product of claim 6, wherein the first computer-readable code is further to permit the user to accept, delegate, or decline the meeting,
  wherein the second computer-readable code is to visually indicate within the calendaring-oriented computer program that the first other user has posted the first update information and that the user is permitted to view regardless of whether the user accepts, delegate, or declines the meeting.

11. The computer program product of claim 6, wherein the first computer-readable code is further to permit the user to accept, delegate, or decline the meeting,
  wherein the third computer-readable code is to permit the user to post the second update information relevant to the meeting and to specify the second other user regardless of whether the user accepts, delegates, or declines the meeting.

12. The computer program product of claim 6, wherein the third computer-readable code is to permit the user to specify the second other user as one or more but less than all users that have been invited to participate in the meeting.

13. A computing device comprising:
  a processor;
  a storage device storing a calendaring-oriented computer program executable by the processor to:
    display a meeting to which the user has been invited to participate as received from a moderator that has previously caused the meeting to be created and sent;
    permit the user to post update information relevant to the meeting and to specify:
      a different user who also has been invited to participate in the meeting as being permitted to view the update information within another calendaring-oriented computer program running on another computing device; and
      a scheduled time at which the update information is to be posted;
    receive input from the user corresponding to the update information relevant to the meeting and specifying the different user and the scheduled time; and
    post the update information to which the input received from the user corresponds, at the scheduled time to the different user, such that the update information is posted at the schedule time that is later than a time at which the moderator previously caused the meeting to be created and sent and that is later than a time at which the calendar-oriented computer program received the meeting,
  wherein a computing device of the different user, a graphical user interface (GUI) is displayed, comprising:
    a window;
    a plurality of tabs on top of the window, including:
      a first tab that is left-most on top of the window, the first tab selectable to accept the meeting by the different user;
      a second tab immediately to the right of the first tab, the second tab selectable to decline the meeting by the different user;
      a third tab immediately to the right of the second tab, the third tab selectable to delegate the meeting by the different user to another user;
      a fourth tab identifying the user that posted the update information, the fourth tab selectable to display in the window:
        a first area towards a top of the window in which the update information is displayed;
        an identification of an attachment provided by the user with the update information, below the update information, the identification selectable by the different user to open the attachment;
        identification of any other users to whom the update information was also sent, below the identification of the attachment; and
        a reply button below the identification of the any other users, the reply button selectable by the different user to reply to add additional information to the update information.

14. The computing device of claim 13, wherein the scheduled time is specified as one of:
  one or more of a desired date and a desired time;
  a desired length of time before the meeting is scheduled to occur.

15. The computing device of claim 13, wherein the calendaring-oriented computer program is further executable by the processor to:
  permit the user to accept, delegate, or decline the meeting; and
  receive additional input from the user corresponding to whether the user is accepting, delegating, or declining the meeting,
  wherein the user is permitted to post the update information relevant to the meeting and to specify a different user regardless of whether the user is accepting, delegating, or declining the meeting.

16. The computing device of claim 13, wherein the calendaring-oriented computer program is to permit the user to specify the different user as one or more but less than all users that have been invited to participate in the meeting.

\* \* \* \* \*